United States Patent [19]

Avramopoulos et al.

[11] Patent Number: 5,146,517
[45] Date of Patent: Sep. 8, 1992

[54] LOW DISTORTION ALL-OPTICAL THRESHOLD DEVICE

[75] Inventors: Hercules Avramopoulos, Red Bank, N.J.; Paul M. William French, Essex, England; M. Christina Gabriel, Middletown; Norman A. Whitaker, Jr., Atlantic Highlands, both of N.J.

[73] Assignee: AT&T Bell Laboratories, Murray Hill, N.J.

[21] Appl. No.: 726,057

[22] Filed: Jul. 5, 1991

[51] Int. Cl.$^5$ ............................................. G02B 6/26
[52] U.S. Cl. .................................... 385/39; 385/24; 385/122; 359/337
[58] Field of Search .................. 359/337; 385/15, 24, 385/27, 32, 122, 39

[56] References Cited

U.S. PATENT DOCUMENTS 5,058,986  10/1991  Nayar et al. ......................... 385/27

OTHER PUBLICATIONS

"Pulse shaping, compression and pedestal suppression employing a nonlinear-optical loop mirror", Doran et al., Optics Letters, vol. 15, No. 22, Nov. 15, 1990, pp. 1294–1296.

Primary Examiner—John D. Lee
Assistant Examiner—John Ngo
Attorney, Agent, or Firm—H. T. Brendzel

[57] ABSTRACT

Transmission capabilities of optical fibers are enhanced with all-optical means for removing noise from signal pulses and for creating clean output pulses with specified characteristics. This is accomplished with a nonlinear interferometer that is designed to operate on an amplified optical signal in the manner of a threshold device. More specifically, the nonlinear interferometer is designed to have a relatively level region in its input-/output transfer function in the neighborhood of the low input signal and in the neighborhood of the high input signal. Depending on the input signal characteristics, it is sometimes beneficial to design the interfereometer so that the nominal high level of the input signal falls approximately in the middle of its corresponding flat region. In another embodiment, a bandpass filter is included at the output of the interferometer to remove the excess bandwidth that is created by the preceding amplifiers and the interferometer itself. The filter also removes the out-of-band noise in the input signal.

25 Claims, 2 Drawing Sheets 5,146,517

LOW DISTORTION ALL-OPTICAL THRESHOLD DEVICE

BACKGROUND OF THE INVENTION

This invention relates to all optical signal processing devices.

Optical fibers have a signal carrying bandwidth that potentially is in the multi-terabit range. This makes optical fibers an attractive choice for signal transmission systems, particularly in long haul transmission systems where the cost of the cable makes up a large fraction of the cost of the communications link. Fiber is far superior to any competing technology in terms of bandwidth, cable size and other factors. However, signal attenuation in long fiber segments is still an issue that has to be addressed. To compensate for signal losses, current optical fiber transmission systems employ electronic repeaters at spacings on the order of tens of kilometers. To detect, re-synchronize, and regenerate the signal, the repeater must convert the optical signal to electrical form, amplify it, and reconvert the amplified signal to optical form. Aside from the complexity and expense associated with such conversions, the need to work in the electronic domain is limiting the bandwidth of the overall transmission system.

It is expected that electronic regeneration will be replaced by fiber amplifiers, which have an overall information-carrying capacity comparable to that of the fiber itself. Erbium fiber amplifiers represent a new technology and promise to provide better performance at a lower cost. While amplifiers can compensate for fiber attenuation by boosting the signal level, the functions of signal regeneration and signal re-timing are not addressed by the amplifier. Without these functions there is no means of restoring the data, and any noise which appears at any point in this type of system merely accumulates.

Moreover, broadband noise over the entire gain bandwidth of the amplifier (known as amplified spontaneous emission) is an inevitable by-product of the amplification process. Consequently, the amplifiers themselves are a significant source of noise in the system. Because the signal itself does not generally occupy the entire amplifier bandwidth, a spectral filter can be used to stop all noise outside the signal bandwidth. While this is an important step in reducing the bit error rate at the receiver, it does nothing to the in-band noise; and it is that noise which generally causes the most errors.

An approach for reducing the noise in the baseline of an optical signal is described in "Pulse shaping, compression and pedestal suppression employing a nonlinear-optical loop mirror", Doran et al., Optics Letters, Vol. 15 No. 22, Nov. 15, 1990, pp. 1294–1296, where the authors reported on the signal transmission properties of a sagnac interferometer. They note that the input/output transfer function 10 of such an interferometer is oscillating between peaks and troughs (see FIG. 1), and that the oscillating function is bounded by two lines: one is a 45 degree line starting at the origin (line 11), and the other is by a nearly horizontal line (line 12). They also note that by using only that portion of the input/output transfer function that starts at the trough next to zero input and ends at a relatively linear portion of the transfer function, the baseline of the signal is compressed relative to the rest of the signal. Any noise that rides on top of that baseline would be compressed.

The fact that the slope of the input/output transfer function starts at a low value and increases as the input power increases also causes the output pulse to be narrower than the input pulse. Doran et al. note that this phenomenon may be thought of as pulse shaping in the form of temporal pulse compression. Increasing the signal into the interferometer much further first shortens the tips of the pulses and generates substantial distortion of the pulses.

SUMMARY OF THE INVENTION

The transmission capabilities of optical fibers are enhanced by providing all-optical means for removing noise from optical signal pulses and for creating clean output pulses with specified characteristics. This is accomplished with a nonlinear interferometer that advantageously cooperates with an applied digital signal having a low level and a high level. More specifically, the nonlinear interferometer is designed to have a relatively level region in its input/output transfer function in the neighborhood of the low input signal and in the neighborhood of the high input signal. Depending on the input signal characteristics, it is sometimes beneficial to design the interferometer so that the nominal high level of the input signal falls approximately in the middle of its corresponding flat region. In another embodiment, a bandpass filter is included at the output of the interferometer to remove the excess bandwidth that is created by the preceding amplifiers and the interferometer itself. The filter also removes the out-of-band noise in the input signal.

DETAILED DESCRIPTION

As indicated above, the very large bandwidth offered by optical fiber makes it an attractive candidate for congested long transmission routes. In particular, optical transmission appears to be an attractive candidate for undersea cable applications. The challenging characteristics of such an application are the large span of the cable, and the need to place amplifiers undersea. One consequence of the latter is that the amplifiers must be extremely reliable. The advent of Erbium amplifiers has heightened interest in undersea applications, but the issue of how to maintain the integrity of pulses as they travel through the fiber and through the amplifiers was heretofore not fully solved.

Figure 2:
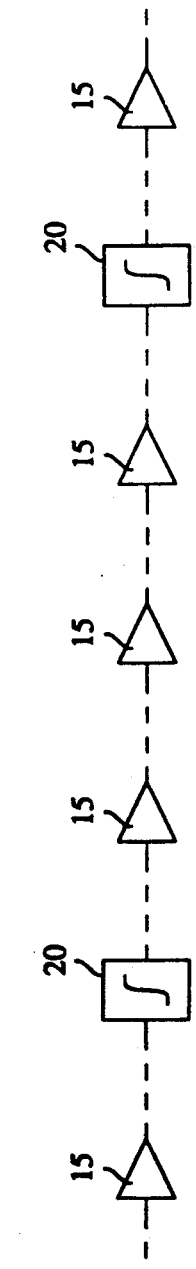
FIG. 2 presents a block diagram of a long haul fiber transmission system.

This problem is solved by the all-optical low distortion threshold device of this invention, which can be employed in a multi-amplifier transmission system as depicted in FIG. 2. In such a transmission system, one or more amplifiers 15 are followed by a threshold device 20. Each amplifier 15 optically amplifies the incoming bi-level signal and after a number of amplifier stages the threshold device suppresses the noise and forms the pulses into the desired pulse shape.

Figure 3:
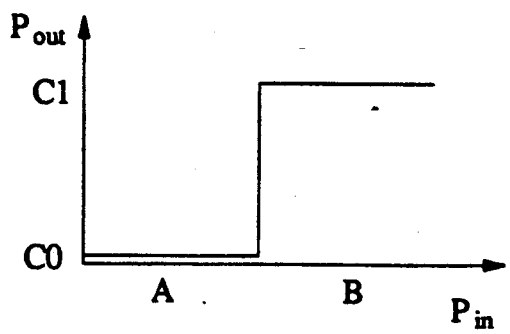
FIG. 3 depicts the transfer function of an ideal threshold device.

FIG. 3 depicts the input/output transfer function of an ideal threshold device. When the input signal is binary with nominal levels A and B, all noise is suppressed in such a device when the superimposed noise level is not too great. The threshold device also fixes the magnitude of the output pulses (C0 and C1) and, to an extent, determines the pulse shape. That is exactly what is needed for the optical signal application of FIG. 2; to wit, an all-optical device with a bandwidth commensurate with that of the transmission fiber, a device that offers zero transmission for any signal with energy below a standard threshold energy, a device that converts any pulse with energy greater than the threshold to some standard fixed energy and shape, and a device that forces the resulting pulse to have a predetermined temporal width and a predetermined spectral width.

Figure 1:
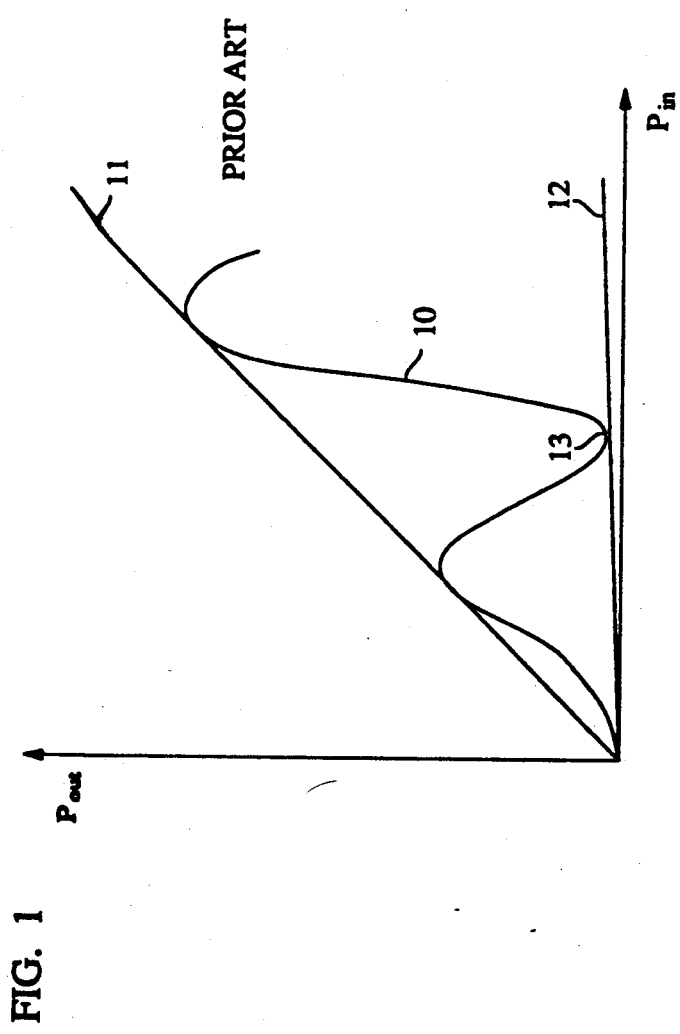
FIG. 1 depicts the input/output transfer function of a nonlinear interferometer.

A recently disclosed use of sagnac interferometers employs the interferometer as a switch. Such a switch is disclosed, for example, in U.S. Patent application Ser. No. 07/521774 filed May 10, 1990, still pending. When investigating the use of the sagnac interferometer as a switch, artisans have concentrated on creating an element that switches as completely and efficiently as possible; and that meant that the trough marked 13 on FIG. 1 had to be made as deep as possible. In contradistinction, exactly the opposite tack is taken for this invention. Specifically, to make the input/output transfer function approach the function of FIG. 3, it is desirable to make the trough as shallow as possible.

Figure 4:
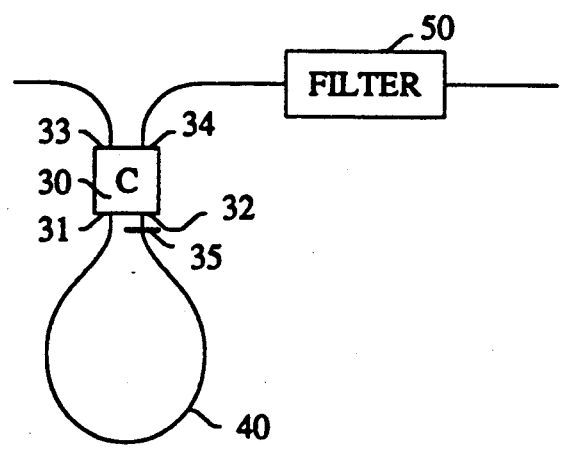
FIG. 4 illustrates one embodiment of an all-optical threshold device, comprising a nonlinear sagnac interferometer.

FIG. 4 presents a diagram of a sagnac interferometer having a 2 by 2 optical coupler 30 and a nonlinear fiber 40 connected between output ports 31 and 32 of the coupler. A signal pulse applied at port 33 is split and passed to ports 31 and 32 in relative strengths proportional to the coupling balance. The pulse exiting port 31 travels through the fiber and re-enters coupler 30 at port 32. Similarly, the pulse exiting port 32 travels through the fiber and re-enters coupler 30 at port 31. The intensity dependent Kerr effect in the fiber provides the nonlinearity in the device. With a perfect 50—50 coupler, the two counterpropagating pulses in the fiber loop receive the same phase change and the Sagnac acts as a reflector. Unbalancing the loop causes an intensity-induced differential phase between the two pulses, and that causes the Sagnac to transmit rather than to reflect. There are three ways to achieve the imbalance: (a) by a coupler that does not split the pulses evenly, (b) by asymmetrically including gain in the fiber loop, i.e., by putting the gain at one end of the fiber loop, and (c) by asymmetrically including loss in the loop. Of these, approach (a) is the one approach that creates the desired change in the shape of the transfer function. In addition, in order to develop a large difference in the power of the pulses, approaches (b) and (c) may also be used, so that the power level of the optical signal can be reduced. Approach (b) results in the addition of further noise from the amplifier in the loop so it is less preferred than approach (c). A coupler that does not split the pulses evenly can be simply purchased. A coupler that creates the imbalance by attenuation can be created by simply adding some attenuation means to one of the ports, such as at port 32. This is illustrated by the wider line segment 35 near port 32. A coupler that creates the imbalance by adding gain into the loop requires an optical amplifier. That is not depicted explicitly in FIG. 4 to avoid confusion due to the depiction of the "loss" approach. It should be understood, however, that placing an optical amplifier in some proximity to port 32, instead of the loss means, is a relatively simple task.

Figure 5:
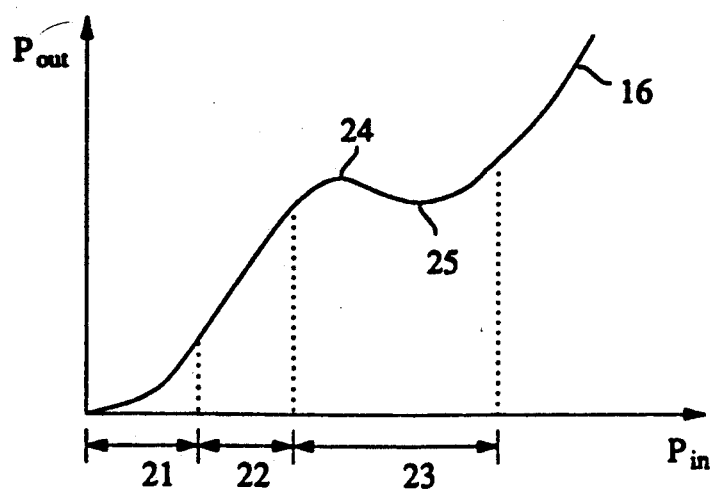
FIG. 5 depicts the transfer function of a nonlinear sagnac interferometer as designed for the purposes of this invention.

FIG. 5 illustrates the input/output transfer function 16 of a nonlinear sagnac interferometer that is substantially unbalanced, as desired for the purposes of this invention. It starts with a low but increasing positive slope in region 21. In region 22 the slope starts at 1, with increasing input power it first increases and then decreases back to 1. In region 23 the slope decreases to zero at the peak point 24, turns negative, increases in the negative direction to some maximum value, then decreases in magnitude till it reaches zero again at dip point 25, and then turns positive again. Regions 21 and 23 are "saturation regions" in that they resemble the saturation regions in a magnetic B-H curve.

For purposes of this invention, operation of the sagnac is restricted to regions 21,22 and that portion of region 23 that includes peak 24 and is non-dipping. The transfer function is said to be non-dipping if point 25 is not below the decision level which, for most applications, might be the midpoint of region 22. Moreover, it may be desirable to further limit the operation of the sagnac to that portion of region 23 that is characterized by a derivative that is less than one in the absolute sense. In region 21 the derivative is less than 1 by definition.

It should be noted that the above discussion of FIG. 5 and the slopes associated with the regions can also be viewed in a normalized sense rather than the absolute sense. That is, the transfer function can be normalized to the average slope in the nearly constant slope portion of region 22. When so normalized, the region 21 should be limited to normalized slopes that are significantly less than 1, such as 0.3 or smaller. The transfer function can be normalized in a different manner as well, such as by developing the function $dP_{out}/dP_{in}$ divided at each point by $P_{out}/P_{in}$. The saturation regions are the areas where the quotient is less than one.

In utilizing the unbalanced nonlinear interferometer as a threshold device, it is useful sometimes to assess the expected noise levels when the optical signal is high. That is, whereas no operating point placement needs to be controlled for the low optical signals, the operating point placement for high optical signals can, and perhaps should, be controlled. This comes about from the fact that transfer function 16 has two neighborhoods in region 23 where the derivative, or slope, is very close to zero where excursions due to noise are essentially eliminated. When the expected noise level is low, the optimum operating point for high optical signals is in the neighborhood of peak point 24. On the other hand, when operating nominally at point 24 (when the signal intensity is high), large noise-induced excursions on the negative side might actually cause a detection error. When such a possibility exists, the nominal operating point is in the neighborhood of point 25.

While it is appreciated that the apparatus of FIG. 4 can be designed to exhibit a transfer function like the one shown in FIG. 5, and that such an apparatus can be utilized as a threshold device, it should also be appreciated that when used as a threshold device it tends to distort the temporal shape of pulses which pass through the device. The wings of the pulse tend to be clipped, thus shortening the pulse duration, and the center of the pulse tends to be flattened when the "high" operating point is set at point 24. Even a "dimple" can be created in the output pulse when the "high" operating point is set at point 25.

One solution to this temporal pulse distortion is to use special optical pulses at the input, known as "solitons", which can self-correct for the distortions induced by the nonlinear sagnac interferometer. However, the use of solitons, or pulses that approximate solitons, does have a practical disadvantage. In typical communications applications the pulses have a duration which is on the order of 50 picoseconds. Solitons which can be used in a nonlinear sagnac interferometer, on the other hand, are on the order of one picosecond or shorter. Generation of pulses that are this short may require a special laser.

Another approach for overcoming the pulse distortion induced in the nonlinear sagnac interferometer that is simple, inexpensive and practical and involves the use of a spectral filter 50 to recover the desired pulse shape after passage through the Sagnac. The particular type of distortion that the nonlinear sagnac interferometer imparts on the pulse envelope (both intensity and phase profile) as it passes through tends to involve errors on the high frequency components of the spectrum. Spectral filter 50, which may be a conventional commercially available Fabry-Perot filter, is connected to port 34 of coupler 30 to block the unwanted components. This filter is considerably narrower than the filter used to block noise from the amplifier, and has a passband width that is approximately equal to the spectral width of the signal itself (a "matched filter").

In an experimental setting, an unbalanced coupler with a 60–40 splitting ratio was used in combination with a filter having a bandwidth of about 80% of the bandwidth of the desired pulse. The pulses used were 60 psec wide and the fiber was approximately 500 m long.

We claim:

1. An optical digital noise reducer comprising:
   an arrangement having a first pair of ports and a second pair of ports, where an input signal applied to one port of said first pair develops an output signal at both ports of said second pair, which arrangement is unbalanced in that an input signal applied to a port of a first pair develops output signals at the ports of said second pair that are not of equal magnitude;
   a non-linear optical signal path connected between one port of said second pair of ports and the other port of said second pair of ports for communicating signals between said one port and said other port of said second pair of ports, to form thereby a transmission path between the ports of said first pair of ports that possesses a sigmoid transfer function which has a first saturation region at low input signal levels, followed by a nearly linear region at intermediate input signal levels, and still followed by a second saturation region at higher input signal levels, where a saturation region is a region where the ratio of changes in output signal over corresponding changes in input signal is substantially smaller than the ratio of changes in output signal over corresponding changes in input signal in the nearly linear region, and
   means for applying two-level input signals where, in the absence of noise, one level of said input signal is at said first region and the other level of said input signal is at said second region.

2. The noise reducer of claim 1 wherein said arrangement comprises a 2 by 2 coupler.

3. The noise reducer of claim 2 wherein said coupler has a first pair of terminals coupled to said first pair of ports and a second pair of terminals coupled to said second pair of ports, where an input at one terminal of said first pair of terminals develops a first output signal at one terminal of said second pair of terminals and a second output signal at the other terminal of said second pair of terminals, where said first output signal and said second output signal are of significantly different magnitudes.

4. The noise reducer of claim 2 wherein said coupler has a first pair of terminals coupled to said first pair of ports and a second pair of terminals coupled to said second pair of ports through gain means interposed between one terminal of said second pair of terminals and one port of said second pair of ports.

5. The noise reducer of claim 2 wherein said coupler has a first pair of terminals coupled to said first pair of ports and a second pair of terminals coupled to said second pair of ports through attenuation means interposed between one terminal of said second pair of terminals and one port of said second pair of ports.

6. The noise reducer of claim 1 wherein said optical signal path comprises an optical fiber.

7. The amplifier of claim 1 wherein the optical wherein said input signals comprise soliton pulses.

8. The amplifier of claim 1 wherein the optical wherein said input signals comprise pulses that approximate solitons.

9. Apparatus responsive to an applied optical digital input signal having a first level and a second level, for developing an output signal with a reduced noise level relative to the noise level of said input signal, comprising:
   a non-linear loop interferometer exhibiting an input/output transfer function which relates said output signal to said input signal that is sigmoid in an initial region thereof, having a lower saturation region at said first level of said optical digital signal and a higher saturation region straddling said second level of said optical digital signal.

10. The apparatus of claim 9 wherein a saturation region is characterized by a change in the magnitude of said output signal that is smaller than a change in the magnitude of said applied optical digital signal causing said change in the magnitude of said output signal.

11. The apparatus of claim 9 wherein:
   said lower saturation region is characterized by a change in the magnitude of said output signal that is smaller than a change in the magnitude of said applied optical digital signal causing said change in the magnitude said output signal, and
   said higher saturation region comprises a first subregion in said input/output transfer function characterized by a positive slope followed by a slope of zero and followed by a negative slope as the magnitude of said input signal is increased, and a second subregion in said input/output transfer function characterized by a negative slope followed by a slope of zero and followed by a positive slope as the magnitude of said input signal is increased.

12. The apparatus of claim 11 wherein said another level of said optical digital signal is adjusted to a neighborhood of said zero slope of said first subregion.

13. The apparatus of claim 11 wherein said another level of said optical digital signal is adjusted to a neighborhood of said zero slope of said second subregion.

14. The apparatus of claim 11 wherein said another level of said optical digital signal is adjusted between said first subregion and said second subregion.

15. An optical digital noise reducer having an input and an output, comprising:
   a non-linear loop interferometer exhibiting an input/output transfer function that is sigmoid in an initial region thereof, with a lower saturation region at one level of input signals applied to said interferometer and a higher saturation region at another level of input signals applied to said interferometer, and
   information bearing digital signals applied to said interferometer having a low level signal in the lower saturation region of said interferometer and a high level signal in the higher saturation region of said interferometer.

16. An optical digital noise reducer having an input and an output, comprising:
   a non-linear loop interferometer having an input/output transfer function that exhibits a sigmoid input/output transfer function in a region thereof, with a lower saturation region at one level of input signal and a higher saturation region at another level of input signal, and
   a bandpass filter at the output of the interferometer.

17. The noise reducer of claim 16 further comprising information bearing digital signals applied to said interferometer having a low level signal in the lower saturation region of said interferometer and a high level signal in the higher saturation region of said interferometer.

18. The noise reducer of claim 16 where the filter is a Fabry-Perot filter.

19. An optical digital noise reducer responsive to an input signal having a first level and a second level, comprising:
   a non-linear loop interferometer with an input/output transfer function having at least two of regions with a derivative $(dP_{out}/dP_{in})$ of magnitude less than 1, and a third region interposed between said two regions and having a derivative of magnitude greater than 1;
   where said input signal is arranged to have its first level at one of said two regions and its second level at the other of said two regions.

20. An optical digital noise reducer responsive to an input signal having a first level and a second level, comprising:
   a non-linear loop interferometer with an input/output transfer function having at least two of regions with a normalized derivative $1/K$ $(dP_{out}/dP_{in})$ of magnitude significantly less than 1, and a third region interposed between said two regions and having an average derivative of magnitude K;
   where said input signal is arranged to have its first level at one of said two regions and its second level at the other of said two regions.

21. An optical digital noise reducer responsive to an input signal having a first level and a second level, comprising:
   a non-linear loop interferometer with an input/output transfer function having at least two of regions with a normalized derivative $$\frac{(dP_{out}/dP_{in})}{(P_{out}/P_{in})}$$

of magnitude less than 1, and a third region interposed between said two regions;
   where said input signal is arranged to have its first level at one of said two regions and its second level at the other of said two regions.

22. An optical digital noise reducer responsive to an input signal having a first level and a second level, comprising:
   a non-linear loop interferometer with an input/output transfer function having a first region spanning from zero input power to a first input power level, a second region spanning from said first input power level to a second power level, and a third region spanning from said second power level to a third power level, where the normalized derivative in said first and third regions is of magnitude significantly less than 1, and
   where said input signal is arranged to have its first level within said first region, and its second level substantially at the center of said third region.

23. An optical digital amplifier comprising:
   optical signal amplification means for developing an amplified signal having a first level and a second level;
   a non-linear loop interferometer exhibiting a sigmoid input/output transfer function, having one saturation region in the neighborhood of said first level and another saturation region in the neighborhood of said second level.

24. The amplifier of claim 23 further comprising a bandpass filter connected to the output of said interferometer.

25. The amplifier of claim 23 wherein the optical amplification means is an erbium amplifier.

* * * * *